(12) United States Patent
Chatterjee et al.

(10) Patent No.: US 11,110,419 B2
(45) Date of Patent: Sep. 7, 2021

(54) SYSTEM AND METHOD FOR SYNTHESIZING POLYMERIC CAPSULES FOR WATER SOFTENING

(71) Applicant: Haier US Appliance Solutions, Inc., Wilmington, DE (US)

(72) Inventors: Somak Chatterjee, Hyderabad (IN); Sharath Chandra Prasad, Hyderabad (IN); Srinivas Pasham, Hyderabad (IN); Balaji Srinivasan, Hyderabad (IN); Gaurav Kumar Verma, Hyderabad (IN); Andrew Reinhard Krause, Louisville, KY (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 259 days.

(21) Appl. No.: 16/106,082

(22) Filed: Aug. 21, 2018

(65) Prior Publication Data
US 2020/0061564 A1    Feb. 27, 2020

(51) Int. Cl.
| | | |
|---|---|---|
| *B01J 2/06* | (2006.01) | |
| *B01J 2/12* | (2006.01) | |
| *B01J 13/20* | (2006.01) | |
| *B01J 13/04* | (2006.01) | |

(52) U.S. Cl.
CPC . *B01J 2/06* (2013.01); *B01J 2/12* (2013.01); *B01J 13/046* (2013.01); *B01J 13/20* (2013.01)

(58) Field of Classification Search
CPC ....... B01J 13/20; B01J 2/12; B01J 2/06; B01J 13/046; A61J 3/07
See application file for complete search history.

(56) References Cited

U.S. PATENT DOCUMENTS

| | | | | |
|---|---|---|---|---|
| 3,873,508 A | * | 3/1975 | Turner | D01F 6/18 526/86 |
| 4,110,529 A | | 8/1978 | Stoy | |
| 4,883,628 A | * | 11/1989 | Kwon | D01D 5/00 264/178 F |
| 5,418,154 A | * | 5/1995 | Aebischer | A61F 2/022 264/4 |
| 5,453,368 A | * | 9/1995 | Tresco | C12N 5/0012 435/182 |

(Continued)

OTHER PUBLICATIONS

Abdulaziz R. Alharbi, et al., Highly Hydrophilic Electrospun Polyacrylonitile, Journal of Membrane and Separation Technology, Lifescience Global, 2016, 1-19.

(Continued)

*Primary Examiner* — Seyed Masoud Malekzadeh
(74) *Attorney, Agent, or Firm* — Dority & Manning, P.A.

(57) ABSTRACT

A system and method are directed toward the synthesis of polymeric capsules using a phase inversion process by extrusion of polymeric droplets through a syringe-needle assembly or an iris-shutter mechanism. The polymeric solution may be prepared by dissolving PAN (polyacrylonitrile) polymer in DMF (Dimethyl Formamide) solvent at high temperature through continuous stirring. Following preparation of the capsules, further treatment was initiated using triethylamine in gelation bath to make the final product an efficient removal agent of water hardness.

11 Claims, 3 Drawing Sheets

(56) References Cited

U.S. PATENT DOCUMENTS

| | | | |
|---|---|---|---|
| 5,656,469 A * | 8/1997 | Tresco | C12N 5/0012 |
| | | | 435/182 |
| 5,667,806 A * | 9/1997 | Kantor | A61K 9/1611 |
| | | | 264/4.1 |
| 7,153,420 B2 | 12/2006 | Clark et al. | |
| 8,029,857 B2 | 10/2011 | Hoek et al. | |
| 2009/0305871 A1 * | 12/2009 | Perera | D01D 4/02 |
| | | | 502/60 |
| 2013/0319599 A1 * | 12/2013 | Huang | D04H 1/413 |
| | | | 156/150 |
| 2019/0055672 A1 * | 2/2019 | Buffington | D01F 1/04 |

OTHER PUBLICATIONS

Prasenjit Bhunia, Chelating Polyacrylonitrile beads for removal of lead and cadmium from wastewater, Science Direct, vol. 193, Mar. 20, 2018, 1-3.

* cited by examiner

SYSTEM AND METHOD FOR SYNTHESIZING POLYMERIC CAPSULES FOR WATER SOFTENING

FIELD OF THE INVENTION

The present subject matter relates generally to water softening agents, and more particularly to systems and methods for synthesizing polymeric capsules for water softening.

BACKGROUND OF THE INVENTION

Appliances, water supply fixtures, plumbing, and other equipment that handle water may experience performance issues or degradation due to "hard water." Hard water generally has a high mineral content that can cause the buildup of deposits, such as calcium, magnesium, and iron, on parts exposed to the water. This buildup may result in appliance degradation and decrease performance. Furthermore, people who are frequently exposed to hard water and/or appliances that use hard water may experience health issues.

Water softening agents are frequently used to reduce the hardness of water on such appliances and equipment. In general, these water softening agents are often in the form of ion exchange resins which generally replace the calcium and magnesium in hard water with sodium or potassium ions. Notably, conventional ion exchange resins are formed as hard capsules that require frequent regeneration when they are saturated and must be replaced entirely. This process may be time-consuming and costly. Furthermore, disposal of the used capsules may introduce some environmental issues, such as leaching of sodium, minerals, or other chemicals.

Accordingly, improved systems and methods for forming water softening agents are desired. In particular, systems and methods which provide for the synthesis of long-lasting polymeric water softening capsules at low cost would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method for synthesizing polymeric capsules for water softening is provided. The method includes preparing a polymeric solution comprising polyacrylonitrile (PAN) and dimethyl formamide (DMF) in a hopper and regulating a valve to selectively provide a flow of polymeric solution into an auger assembly. The method further includes extruding the polymeric solution through a discharge nozzle to form the polymeric capsules, submerging the polymeric capsules in a gelation bath and treating the polymeric capsules in an amine solution.

In another exemplary embodiment, a system for synthesizing polymeric capsules for water softening is provided. The system includes a hopper for receiving a polymeric solution comprising polyacrylonitrile (PAN) and dimethyl formamide (DMF). A valve is operably coupled to the hopper for selectively providing a flow of polymeric solution and an auger assembly includes a discharge nozzle, the auger assembly being configured for receiving the flow of polymeric solution and selectively extruding the polymeric solution through the discharge nozzle to form the polymeric capsules. A gelation bath is positioned below the discharge nozzle for receiving and submerging the polymeric capsules.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
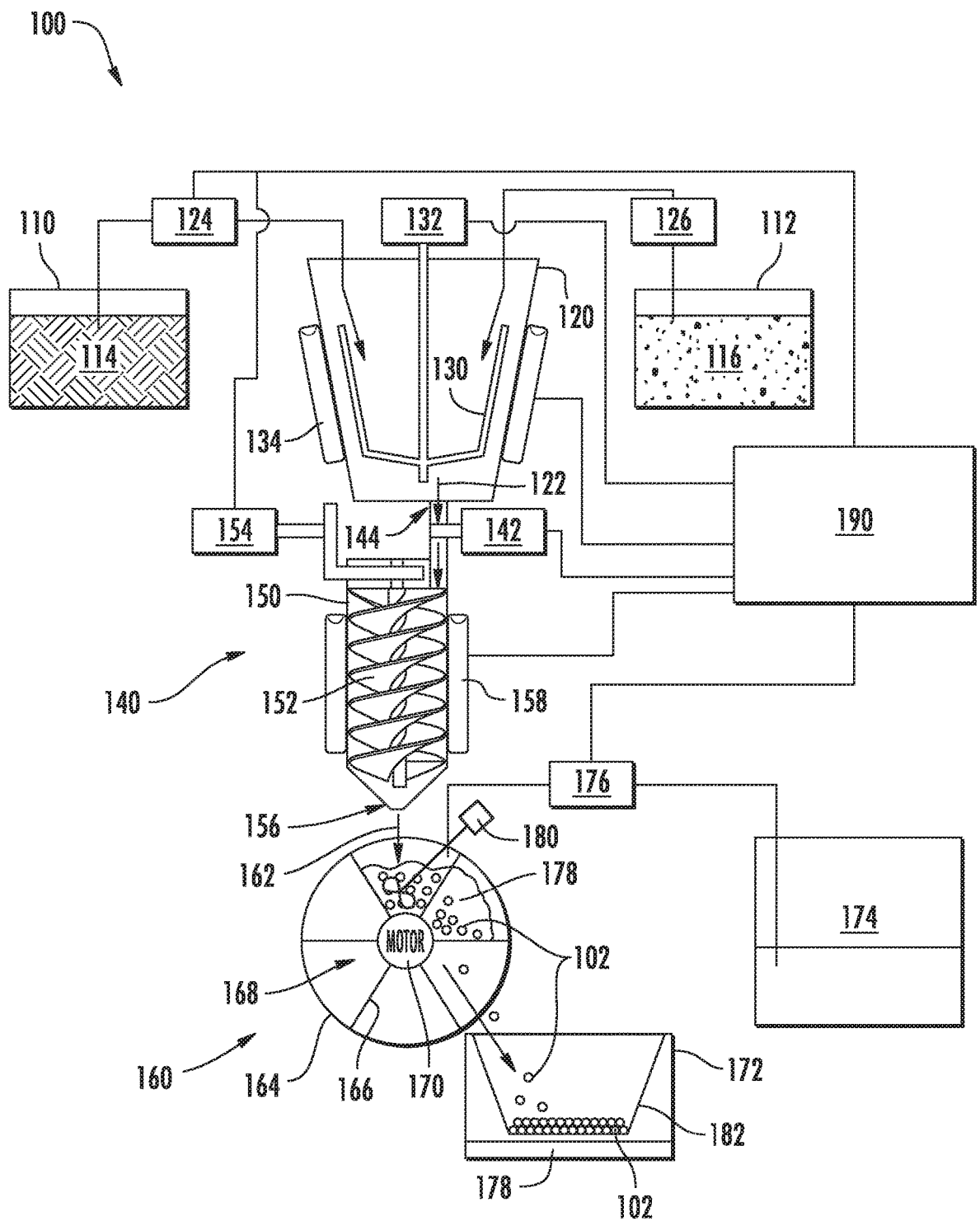
FIG. 1 provides a schematic view of a system for synthesizing polymeric capsules for water softening according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a system 100 for synthesizing absorbent polymeric capsules 102 will be described according to an exemplary embodiment of the present subject matter. These polymeric capsules 102 may be used as a water softening agent in any suitable appliance, fixture, plumbing, or other equipment to reduce or eliminate issues associated with the use or exposure to hard water. It should be appreciated that system 100 is described herein only for the purpose of explaining aspects of the present subject matter. Variations and modifications may be made to system 100 and/or its method of operation in order to form polymeric capsules 102 while remaining within scope of the present subject matter.

According to the illustrated embodiment, system 100 includes a first reservoir 110 and a second reservoir 112 which contain products used to form polymeric capsules 102. Specifically, first reservoir 110 may be filled with a poly acrylonitrile (PAN) polymer 114 and second reservoir 112 may be filled with a dimethyl formamide (DMF) solvent 116. Although PAN 114 and DMF 116 are described herein as being the primary products used to synthesize polymeric capsules 102, it should be appreciated that according to alternative embodiments, additional or alternative components or materials may be added or used.

System 100 further includes a hopper 120 which is generally configured for receiving PAN 114 from first reservoir 110 and DMF 116 from second reservoir 112 so that they may be mixed together to form a polymeric solution (i.e., the mixture of PAN 114 and DMF 116, as identified by reference numeral 122). In this regard, for example, system 100 includes a PAN pump 124 which is operably coupled to first reservoir 110 and a DMF pump 126 which is operably coupled to second reservoir 112. According to the illustrated embodiment, pumps 124, 126 are positive displacement pumps that can handle viscous or non-viscous fluids and are used to regulate the flow of chemicals or products into hopper 120.

System 100 may further include an agitation element 130 which is positioned within hopper 120 and generally configured for agitating, mixing, or otherwise homogenizing the polymeric solution 122 within hopper 120. In this regard, for example, agitation element 130 may include an impeller, a vane agitator, an auger, a blade, or some combination thereof. Agitation element 130 is rotatably positioned in hopper 120 and operably coupled to a drive motor or agitation motor 132 which is configured for selectively rotating agitation element 130. The homogenization process may also serve to properly remove any air bubbles from polymeric solution 122, which might otherwise cause problems in the extrusion process describe below.

As used herein, "motor" may refer to any suitable drive motor and/or transmission assembly for rotating a system component. For example, agitation motor 132 may be a brushless DC electric motor, a stepper motor, or any other suitable type or configuration of motor. For example, agitation motor 132 may be an AC motor, an induction motor, a permanent magnet synchronous motor, or any other suitable type of AC motor. In addition, agitation motor 132 may include any suitable transmission assemblies, clutch mechanisms, or other components.

Hopper 120 may further include one or more hopper heating elements 134 which are fixed to hopper 120 and are configured for heating the mixture during the mixing process. According to the illustrated embodiment, hopper heating element 134 is a heating pad wrapped around an exterior of hopper 120. However, it should be appreciated that according to alternative embodiments, any suitable type of heating element may be used and placed in thermal communication with the mixture within a hopper in any other suitable manner. For example, electrical resistance heating elements may be positioned within hopper 120 in direct contact with the mixture. Alternatively, hopper heating element 134 may be a wire wound heating element, a printable heater, a strip heater, an induction heater, or any other suitable type and configuration of heating element.

After the mixture of PAN 114 and DMF 116 is thoroughly homogenized, polymeric capsules 102 are formed using an auger assembly 140. A valve 142 is operably coupled to an outlet 144 of hopper 120 for regulating the flow of polymeric solution 122. In this regard, valve 142 may be a solenoid-actuated valve, such as a ball valve, a butterfly valve, etc. However, it should be appreciated that valve 142 could alternatively be any suitable type of valve for regulating the flow of polymeric solution 122 in any other suitable manner.

Auger assembly 140 includes an auger body 150 is configured for receiving the flow of polymeric solution 122. An auger 152 is rotatably mounted within auger body 150 and an auger motor 154 may be mechanically coupled to the auger 152 to selectively rotate auger 152 to urge the polymeric solution 122 through auger body 150 and out of a discharge nozzle 156. For example, discharge nozzle 156 may include a syringe and needle assembly or an iris-shutter mechanism. Although a single discharge nozzle 156 is illustrated, it should be appreciated that the process may be expedited by including multiple discharge nozzles fed by one or more augers. Auger assembly 140 may further include an auger heating element 158 for selectively heating polymeric solution 122 within auger body 150. Notably, auger motor 154 may be the same as or similar to agitation motor 132 and auger heating element 158 may be the same as or similar to hopper heating element 134, as described above. In general, auger 152 may act as an extruder to selectively dispense a desired quantity of polymeric solution 122 through discharge nozzle 156.

Although auger assembly 140 is described above as being used to urge polymeric solution 122 through discharge nozzle 156, it should be appreciated that other mechanisms and methods for urging or selectively directing polymeric solution 122 are possible and within the scope of the present subject matter. For example, according to alternative embodiments, a positive displacement mechanism may be used, such as a pneumatic or hydraulically actuated piston, a cam mechanism, a system of mechanical linkages, or other suitable actuators may be used. According to still other embodiments, a pressure actuated diaphragm may be used to regulate the flow of polymeric solution 122.

According to exemplary embodiments of the present subject matter, system 100 may further include a viscosity measurement system (not shown) which may be used to provide feedback to controller 190. More specifically, for example, viscosity measurement system may measure the viscosity of polymeric solution 122 at an upstream end of auger 152. The measured viscosity may be communicated to controller 190 which may in turn regulate the amount of heat energy provided to the polymeric solution 122 within hopper 120 (e.g., by hopper heating element 134). Alternatively, controller 190 may regulate the speed of auger motor 154 and/or regulate the amount of polymer/solvent introduced by pumps 124, 126.

System 100 may further include a gelation bath 160 which is positioned below auger assembly 140. Gelation bath 160 is generally configured for receiving polymeric droplets (e.g., as indicated by arrow 162) of polymeric solution 122 to facilitate a phase inversion to form polymeric capsules 102. In this regard, according to the illustrated embodiment, gelation bath 160 includes a partitioned receiving drum 164 into which polymeric droplets 162 may fall. More specifically, receiving drum 164 may include a plurality of radially extending vanes 166 which define a plurality of drum reservoirs 168. Receiving drum 164 is rotatable about a horizontal axis and may be driven by a drum motor 170 to selectively position one of the drum reservoirs 168 under discharge nozzle 156. In this manner, polymeric droplets 162 may collect in one of the drum reservoirs 168 and may be discharge under the force of gravity into a collecting tank 172 as receiving drum 164 is rotated.

As shown, water is pumped into the top drum reservoir 168 to facilitate the cooling and gelation of polymeric droplets 162. More specifically, system 100 may include a water reservoir 174 and a water pump 176 which is fluidly coupled to water reservoir 174 and configured for selectively pumping water 178 or any other suitable anti-solvent into the desired drum reservoir 168. According to an exemplary embodiment, system 100 may further include a mixer 180 which is selectively positioned within one or more drum reservoirs 168 to mix or agitate polymeric droplets 162 and water 178. For example, mixer 180 may be a simple blade mixer coupled to an actuation mechanism to move a mixing element into and out of drum reservoir 168 when it is stationary. Stirring the polymeric capsules 102 in the gelation bath may generally reduce the likelihood of agglomeration or binding of the polymeric capsules 102.

As drum motor 170 slowly rotates receiving drum 164 (e.g., in the clockwise direction shown in FIG. 1), polymeric droplets 162 are formed into polymeric capsules 102 and dropped along with water 178 into collecting tank 172. As illustrated, collecting tank 172 may further include a suspended mesh screen 182 which collects polymeric capsules 102 and permits water 178 to separated and collected for disposal. According to exemplary embodiments the present subject matter, the isolated polymeric beads 102 may then be permitted to soak in an amine ($-NH_2$) solution, e.g., such as a triethylamine bath before being dried and used as a water softening agent.

Although receiving drum 162 is described above to explain aspects of the present subject matter, it should be appreciated that other mechanisms or devices for separating polymeric capsules 102 from water 178 may be used according to alternative embodiments. For example, vibration mechanisms may be used to prevent agglomeration of polymeric capsules, the size of drum reservoirs 168 may vary, other screening or separating mechanisms may be used, etc. It should be appreciated that other variations and modifications may be made while remaining within the scope of the present subject matter.

Operation of system 100 is controlled by a controller or processing device 190 that is operatively coupled to various component of system 100, e.g., such as pumps 124, 126, 176, motors 132, 154, 170, valves 142, and/or heating elements 134, 158. As described in more detail below with respect to FIG. 2, controller 190 may include a memory and microprocessor, such as a general or special purpose microprocessor operable to execute programming instructions or micro-control code associated with methods described herein. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Components of system 100 may be in communication with controller 190 via one or more signal lines or shared communication busses.

Figure 2:
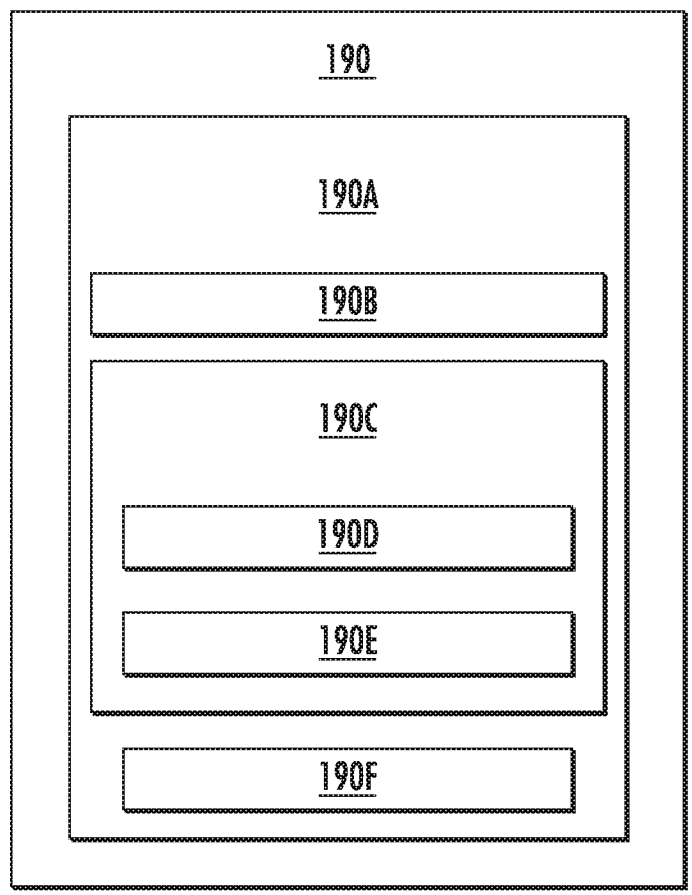
FIG. 2 depicts certain components of a controller according to example embodiments of the present subject matter.

FIG. 2 depicts certain components of controller 190 according to example embodiments of the present disclosure. Controller 190 can include one or more computing device(s) 190A which may be used to implement methods as described herein. Computing device(s) 190A can include one or more processor(s) 190B and one or more memory device(s) 190C. The one or more processor(s) 190B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 190C can include one or more non-transitory computer-readable storage medium(s), such as RAM, ROM, EEPROM, EPROM, flash memory devices, magnetic disks, etc., and/or combinations thereof.

The memory device(s) 190C can include one or more computer-readable media and can store information accessible by the one or more processor(s) 190B, including instructions 190D that can be executed by the one or more processor(s) 190B. For instance, the memory device(s) 190C can store instructions 190D for running one or more software applications, displaying a user interface, receiving user input, processing user input, etc. In some implementations, the instructions 190D can be executed by the one or more processor(s) 190B to cause the one or more processor(s) 190B to perform operations, e.g., such as one or more portions of methods described herein. The instructions 190D can be software written in any suitable programming language or can be implemented in hardware. Additionally, and/or alternatively, the instructions 190D can be executed in logically and/or virtually separate threads on processor(s) 190B.

The one or more memory device(s) 190C can also store data 190E that can be retrieved, manipulated, created, or stored by the one or more processor(s) 190B. The data 190E can include, for instance, data to facilitate performance of methods described herein. The data 190E can be stored in one or more database(s). The one or more database(s) can be connected to controller 190 by a high bandwidth LAN or WAN, or can also be connected to controller through network(s) (not shown). The one or more database(s) can be split up so that they are located in multiple locales. In some implementations, the data 190E can be received from another device.

The computing device(s) 190A can also include a communication module or interface 190F used to communicate with one or more other component(s) of controller 190 or system 100 over the network(s). The communication interface 190F can include any suitable components for interfacing with one or more network(s), including for example, transmitters, receivers, ports, controllers, antennas, or other suitable components.

Now that the construction of system 100 and the configuration of controller 190 according to exemplary embodiments have been presented, an exemplary method 200 of operating a system for forming polymeric capsules for water softening will be described. Although the discussion below refers to the exemplary method 200 of operating system 100, one skilled in the art will appreciate that the exemplary method 200 is applicable to the operation of a variety of other system configurations and methods of operation. In exemplary embodiments, the various method steps as disclosed herein may be performed by controller 190 or a separate, dedicated controller.

Figure 3:
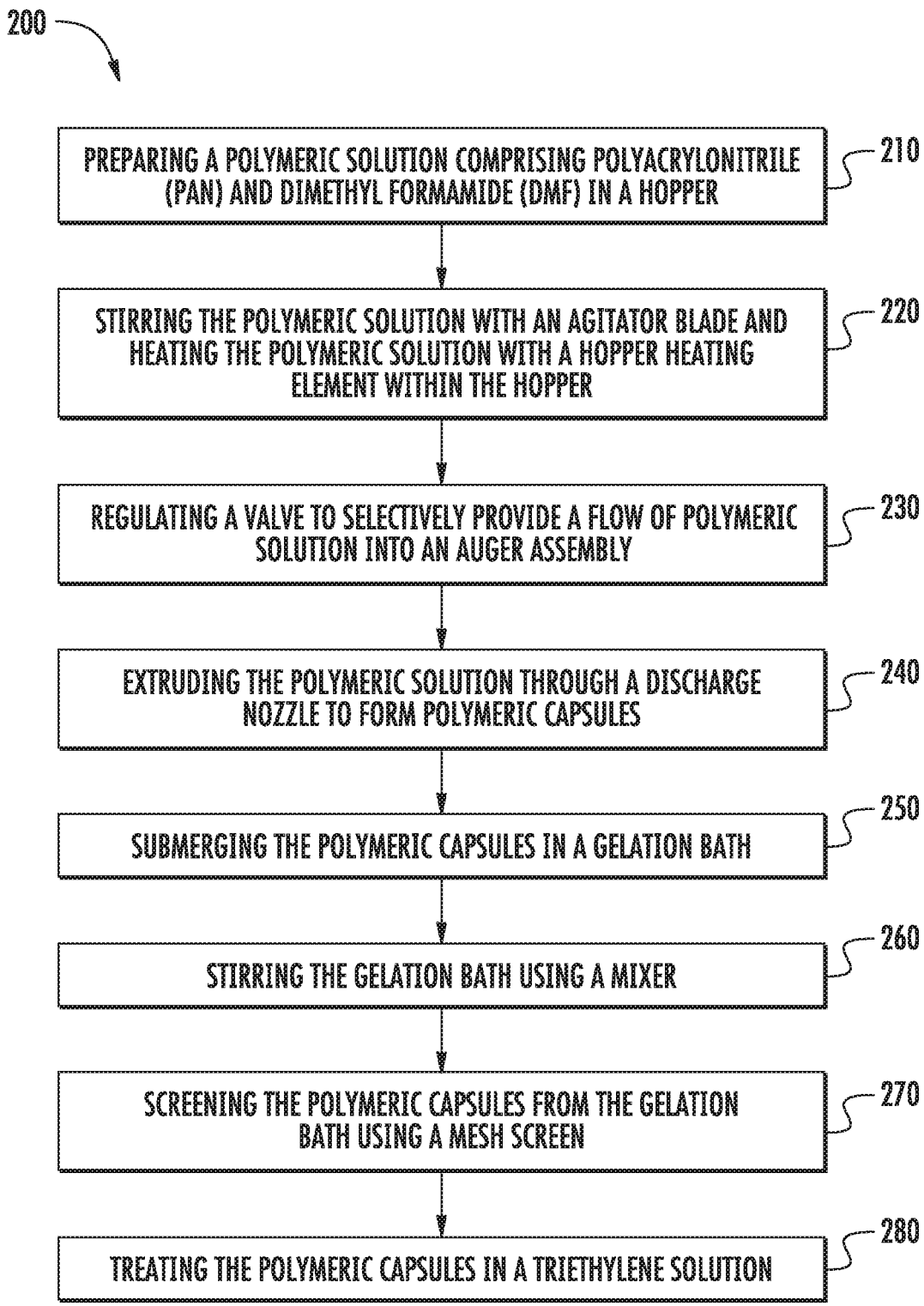
FIG. 3 illustrates a method for synthesizing polymeric capsules for water softening according to an exemplary embodiment of the present subject matter.

Referring now to FIG. 3, method 200 includes, at step 210, preparing a polymeric solution comprising polyacrylonitrile (PAN) and dimethyl formamide (DMF) in the hopper. For example, as described above according to an exemplary embodiment, PAN may be stored in a first reservoir and DMF may be stored in a second reservoir. Dedicated pumps may provide fluid communication between the storage reservoirs and the hopper, thereby selectively pumping the desired portions of solution into the hopper.

Although the polymeric solution is described herein as including PAN and DMF, it should be appreciated that additional chemicals, solutions, or products may be added according to alternative embodiments. Preparing the polymeric solution may further include steps such as mixing, agitating, homogenizing, heating, etc. For example, step 220 includes stirring the polymeric solution with an agitator blade that is rotatably mounted within the hopper and heating the polymeric solution with a hopper heating element that is positioned within the hopper, wraps around the hopper, or is otherwise in thermal communication with the hopper.

After the polymeric solution is prepared, step 230 includes regulating a valve to selectively provide a flow of the polymeric solution into an auger assembly. According to the exemplary embodiment, auger assembly includes an auger body housing a motor-driven auger. Step 240 includes selectively extruding the polymeric solution through a discharge nozzle. For example, the auger assembly may urge the polymeric solution through a needle and syringe assembly. Notably, as the polymeric solution is urged from the needle and syringe assembly, it is separated into a plurality of polymeric droplets. It should be appreciated that other methods for converting the polymeric solution into polymeric droplets are possible and within scope of the present subject matter.

According to exemplary embodiments, step 250 includes submerging the polymeric droplets or capsules in a gelation bath which may for example include water or other liquids. This process facilitates phase inversion of the polymeric droplets into polymeric capsules. Step 260 includes stirring the gelation bath using a mixer to prevent agglomeration of the polymeric capsules.

On completion of the gelation bath, step 270 may include screening the polymeric capsules from the gelation bath using a mesh screen or other filtering mechanism. Step 280 includes treating the polymeric capsules in a triethylamine solution. The resulting polymeric capsules may be used for water softening or other purposes as known in the art.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using system 100 as an example, it should be appreciated that these methods may be applied to the operation of any suitable system for forming polymeric capsules for water softening.

System 100 and method 200 are directed toward the synthesis of polymeric capsules using a phase inversion method by extrusion of polymeric droplets through a syringe-needle assembly. The polymeric solution was prepared by dissolving PAN (polyacrylonitrile) polymer in DMF (Dimethyl Formamide) solvent at high temperature through continuous stirring. Following preparation of the capsules, further treatment was initiated using triethylamine in gelation bath to make the final product an efficient removal agent of water hardness.

This system and method generally provides a frugal and novel solution for water softening, e.g., because polymeric capsules are cheaper and last longer. In addition, the process involves removing calcium and magnesium through chelation with amine group, thereby reducing chances of sodium leaching during regeneration. The resulting polymeric capsules have a relatively low bulk density compared to other ion exchange resins, and can therefore can be retrofitted to any chamber or for use in any appliance or equipment. Furthermore, chemical adsorption takes place, therefore longer life is expected and disposal can involve re-dissolving the polymers in paints and organic solvents, therefore leaching of adsorbed calcium and magnesium can be avoided. Other benefits and advantages of the present subject matter will be apparent to those skilled in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for synthesizing polymeric capsules for water softening, the method comprising:
preparing a polymeric solution comprising polyacrylonitrile (PAN) and dimethyl formamide (DMF) in a hopper;
regulating a valve to selectively provide a flow of polymeric solution into an auger assembly;
extruding the polymeric solution through a discharge nozzle to form the polymeric capsules;
submerging the polymeric capsules in a gelation bath; and
treating the polymeric capsules in an amine solution comprising trimethylamine solution to remove calcium and magnesium from the polymeric capsules.

2. The method of claim 1, wherein preparing a polymeric solution comprises:
stirring the polymeric solution with an agitator blade within the hopper.

3. The method of claim 1, wherein preparing a polymeric solution comprises:
heating the polymeric solution with a hopper heating element.

4. The method of claim 1, wherein the discharge nozzle comprises a syringe and needle assembly, and extruding the polymeric solution comprises selectively urging the polymeric solution through the syringe and needle assembly.

5. The method of claim 1, wherein the gelation bath comprises water.

6. The method of claim 1, further comprising:
stirring the gelation bath using a mixer.

7. The method of claim 1, wherein a receiving drum is positioned below the discharge nozzle for receiving the polymeric solution and wherein a water pump urges a flow of water into the receiving drum.

8. The method of claim 7, wherein the receiving drum includes a plurality of radially extending vanes which divide the receiving drum into a plurality of drum reservoirs.

9. The method of claim 8, wherein the receiving drum is rotatable to receive the polymeric solution in one of the plurality drum reservoirs while dropping the polymeric capsules out of the gelation bath from another one of plurality the drum reservoirs.

10. The method of claim 1, further comprising:
screening the polymeric capsules from the gelation bath using a mesh screen.

11. The method of claim 1, wherein the amine solution further comprises triethylene.

* * * * *